United States Patent [19]

Rankins et al.

[11] 4,018,294
[45] Apr. 19, 1977

[54] DRAFT ATTACHMENT FOR WHEELED IMPLEMENTS

[76] Inventors: Everett V. Rankins, 329 Flores Court, Manteca, Calif. 95336; Raymond Keith Foster, P.O. Box 1, Madras, Oreg. 97741

[22] Filed: Dec. 17, 1975

[21] Appl. No.: 641,617

[52] U.S. Cl. .................................................. 180/13
[51] Int. Cl.² ...................................... B62D 61/08
[58] Field of Search ............... 180/13, 14 A, 26 R, 180/26 A, 52, 66 R, 66 F, 31, 11, 12, 14 R

[56] References Cited

UNITED STATES PATENTS

| | | | |
|---|---|---|---|
| 2,771,145 | 11/1956 | Peters | 180/26 R |
| 2,957,534 | 10/1960 | Burdett | 180/26 R |
| 3,056,461 | 10/1962 | Quayle | 180/52 |
| 3,519,097 | 7/1970 | Commons | 180/26 R |
| 3,605,929 | 9/1971 | Rolland | 180/26 R |
| 3,672,459 | 6/1972 | Rankins | 180/13 |
| 3,738,440 | 6/1973 | Storm | 180/31 |
| 3,821,990 | 7/1974 | Elmslie | 180/14 A |
| 3,876,023 | 4/1975 | Hushower | 180/12 |

FOREIGN PATENTS OR APPLICATIONS

| | | | |
|---|---|---|---|
| 8,268 | 2/1956 | Germany | 180/13 |
| 519,254 | 3/1955 | Italy | 180/13 |
| 603,805 | 6/1948 | United Kingdom | 180/13 |

*Primary Examiner*—Joseph F. Peters, Jr.
*Assistant Examiner*—Jack D. Rubenstein
*Attorney, Agent, or Firm*—Huebner & Worrel

[57] ABSTRACT

A draft attachment for wheeled implements. The attachment is characterized by an elongated frame member having a coupling located at one end thereof adapted to connect the frame member with a wheel-supported implement, a singular ground wheel disposed substantially beneath the opposite end of the frame member and pivotally connected thereto in supporting relation therewith, a power train connected to the wheel for selectively driving the ground wheel about its axis of rotation and an operator's platform mounted on the frame member in fixed relation therewith.

5 Claims, 5 Drawing Figures

DRAFT ATTACHMENT FOR WHEELED IMPLEMENTS

BACKGROUND OF THE INVENTION

1. Field of the Invention

The invention generally relates to attachments for wheeled implements, and more particularly to a single-wheeled draft attachment adapted to be coupled in a supported relationship with a wheeled implement, whereby vertical and lateral stability is imparted to the draft attachment by the wheeled implement as the implement is propelled by the draft attachment.

2. Description of the Prior Art

The prior art is, of course, replete with self-propelled machines, such as tractors, for towing agricultural implements. Included among such machines are tractors which utilize a plurality of wheels and parallel tracks for imparting vertical and lateral stability to the machines, particularly where the machines are controlled by a rider.

As can be appreciated by those familiar with the agricultural industry, tractors employed in towing implements such as balers, rakes, spray rigs and the like, substantial financial investments are required in order to initially purchase the tractor and, thereafter, substantial operational and maintenance costs are encountered. Of course, tractors often are characterized by a power potential far exceeding specified operational requirements, since a power potential must be built into the tractor which affords wide range of utility in order for the initial investment to be justified.

However, certain implements such as hay balers and the like, are equipped with power plants which function independently of the power plants provided for the tractors employed in towing the implements. As can be appreciated by those familiar with hay balers, and similar implements, a baler's packing ram is, in many instances, supported for rectilinear motion along a path paralleling the associated tractor's direction of travel. Consequently, oscillatory motion is induced in the implement which is, in turn, transmitted to the tractor through various couplings and drive linkages. Due to "slop" normally present in such couplings and linkages, the induced oscillatory motion tends to be amplified as it is transmitted to the towing tractor. This effect results in a cyclic loading of the towing tractor. Hence, the implement and the tractor, as well as its operator, are subjected to shock loads resulting in undesirable wear and severe fatigue as the tractor is cyclically loaded as a consequence of the reciprocation of the ram or similar device.

It has been suggested that a single wheel, self-propelling attachment be provided for drafting purposes in order to reduce financial investments and operational costs, while enhancing maneuverability of lightweight wheeled implements.

For example, U.S. Pat. No. 3,672,459 to Everett V. Rankins, which issued June 27, 1972, discloses an attachment for farm implements such as balers, rakes, spraying equipment, and the like. While the attachment disclosed and claimed in the patent serves satisfactorily for its intended purpose, it has been found desirable to provide an improved single wheel, self-propelling attachment having even greater utility and simplicity than that of the attachment disclosed in the aforementioned United States Letters Patent.

It is, therefore, the general purpose of the instant invention to provide a draft attachment for a wheeled vehicle which is of a simplified design, economic to fabricate and operate and is characterized by over-all improved maneuverability.

OBJECTS AND SUMMARY OF THE INVENTION

It is an object of the instant invention to provide an improved draft attachment for wheeled implements which overcomes the aforementioned difficulties and disadvantages.

It is another object to provide an improved draft attachment which is economic to fabricate, simple to operate and practical to employ.

It is another object to provide an improved attachment for a wheeled vehicle which can readily be attached to farm implements and employed for drawing the implements.

It is another object to provide an improved draft attachment having a singular ground wheel and adapted to obtain lateral and vertical stability from attached wheeled implements.

Another object is to provide an improved draft attachment for wheeled implements particularly suited for use in drawing farm implements such as rakes, balers, spray rigs and the like, and adapted to acquire stability from the implement and power from a PTO aboard the implement, whereby both stability and power for traction and acquired from the implement.

Another object is to provide an improved draft attachment which is particularly useful in connection with farm implements, although not necessarily restricted thereto, since the attachment may be suitably installed and employed in propelling wheeled vehicles such as overland trailers and the like.

These and other objects and advantages are achieved through the use of a draft attachment characterized by a frame supported by a singular ground wheel pivotally attached thereto and a coupling for rigidly connecting the frame member to a selected wheeled implement, in order to achieve for the attachment both vertical and lateral stability, a hydraulic circuit including a motor coupled to the ground wheel through a gear reduction unit, and a hydraulic circuit connected with the motor including a pump connected in driven relationship with a PTO mounted on the implement, as will become more readily apparent by reference to the following description and claims in light of the accompanying drawings.

DESCRIPTION OF THE PREFERRED EMBODIMENT

Figure 1:
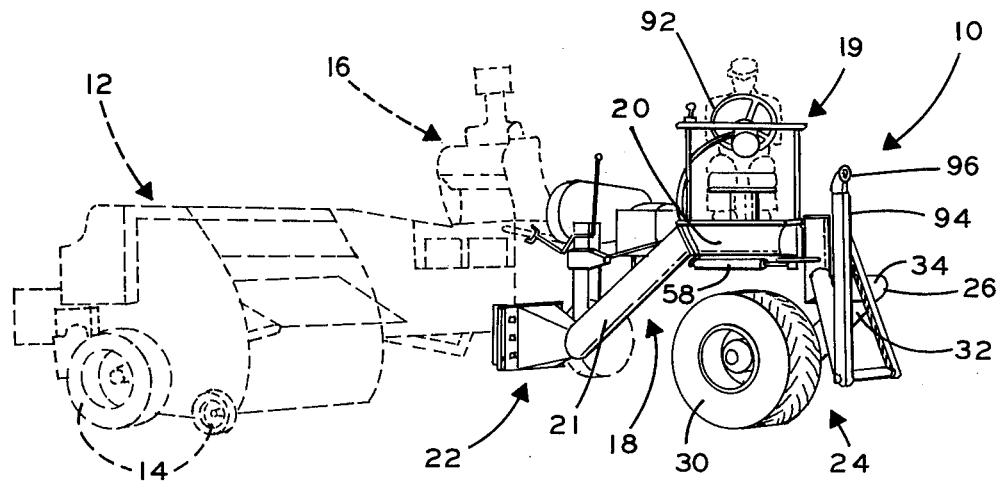
FIG. 1 is a perspective view of an improved draft attachment embodying the principles of the instant invention, illustrating the frame member of the attachment connected with a wheeled implement, shown in phantom, through an improved coupling.
Figure 2:
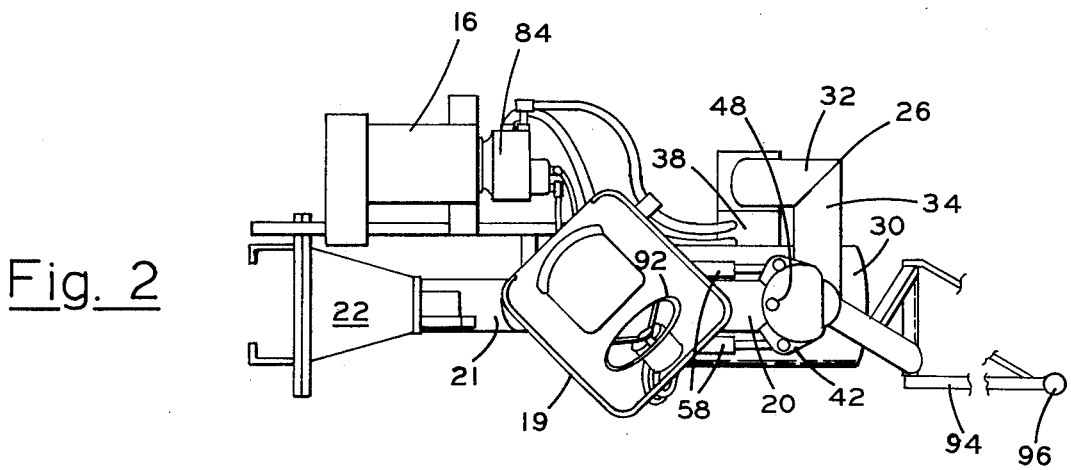
FIG. 2 is a fragmented top plan view of the attachment shown in FIG. 1.

Referring now to the drawings wherein like reference characters designate like or corresponding parts throughout the several views, there is shown in FIG. 1 a draft attachment, generally designated 10, attached to a wheeled implement, generally designated 12, and illustrated in phantom.

It will, at this point, be appreciated that the implement 12 is any wheeled implement provided with a plurality of wheels through which vertical and lateral stability is acquired and equipped with a source of power herein referred to as a PTO, (Power Take-Off), for driving mechanical power trains for performing specific functions. As shown, the implement 12 is a hay baler having a plurality of wheels 14 through which both vertical and lateral stability is acquired, and a PTO 16 for driving the components of the baler during baling operations.

Since implements such as hay balers are well known and fully understood, and since the specific implement drawn by the draft attachment forms no part of the claimed invention, a detailed description of the implement is omitted in the interest of brevity. It suffices to understand that the implement 12 is an implement which is supported by wheels an through which both vertical and lateral stability is acquired.

The draft attachment 10 is of a simplified design and includes an elongated frame member 18 having mounted thereon an operator's platform 19. The frame member 18 is characterized by a leading end portion and trailing end portion and includes a horizontal segment 20, upon which the platform 19 is mounted, and a rearwardly inclined segment 21. A coupling 22, hereinafter more particularly described, is mounted on the frame member 18, at the trailing end thereof. The coupling 22 is provided for use in connecting the draft attachment to the implement in a supported relationship therewith, while a steering assembly, generally designated 24, is provided for supporting the leading end of the frame member.

Figure 3:
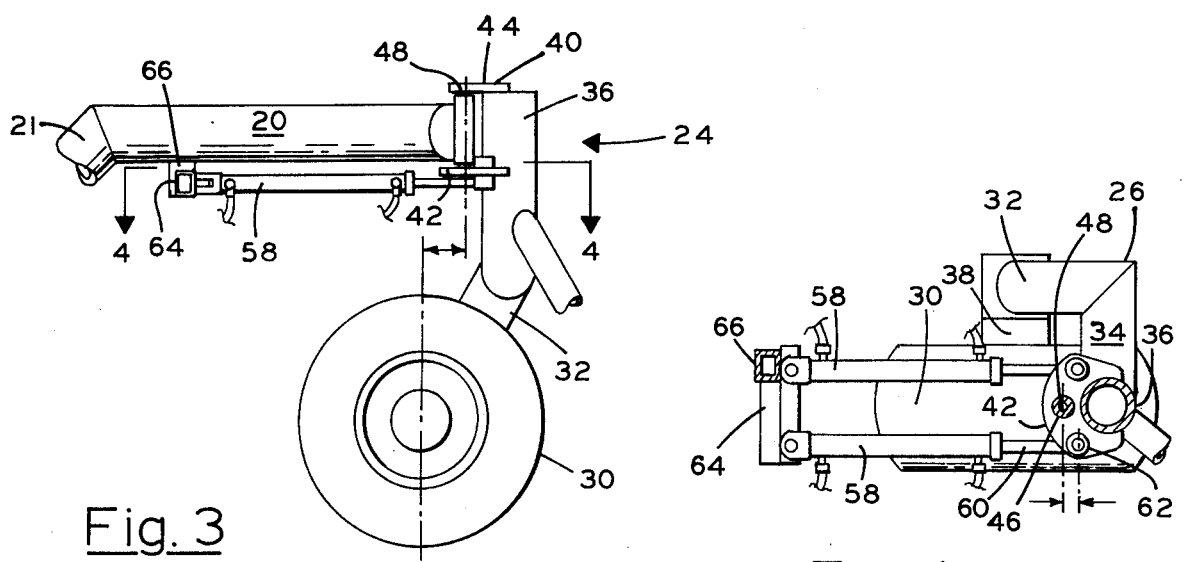
FIG. 3 is a fragmented side elevation of the frame member and wheel shown in FIG. 1.

The steering assembly 24 includes an all-welded wheel frame 26, preferably having a configuration of a caster frame, which is supported by a rotatable ground wheel 30 mounted thereon. That is to say, the frame 26 is so configured that the axis of the wheel 30 is disposed rearwardly, relative to the normal direction of travel of the frame 26, from a vertical axis forming a turning axis for the frame 26, as best illustrated in FIG. 3. The wheel frame 26 includes an inclined segment 32, a horizontally extended segment 34, and a crown segment 36. It will, of course, be appreciated that the caster configuration for the wheel frame 26 is omitted where found desirable. In such instances the segment 32 is vertically oriented, rather than inclined as shown in the drawings.

It should be noted, however, that where the caster configuration is employed an improved capability for maneuvering a trailing implement is imparted to the frame 26, since the frame 26 tends to move laterally through a distance substantially equal to the distance between the axis of the wheel and the turning axis, as the wheel is angularly displaced to the limit of its throw. Thus, lateral motion is imparted to the implement 12 so that a trailing implement, such as a hay baler or the like, is translated laterally. This motion is particularly desirable for recovering scattered hay and the like.

Figure 6:
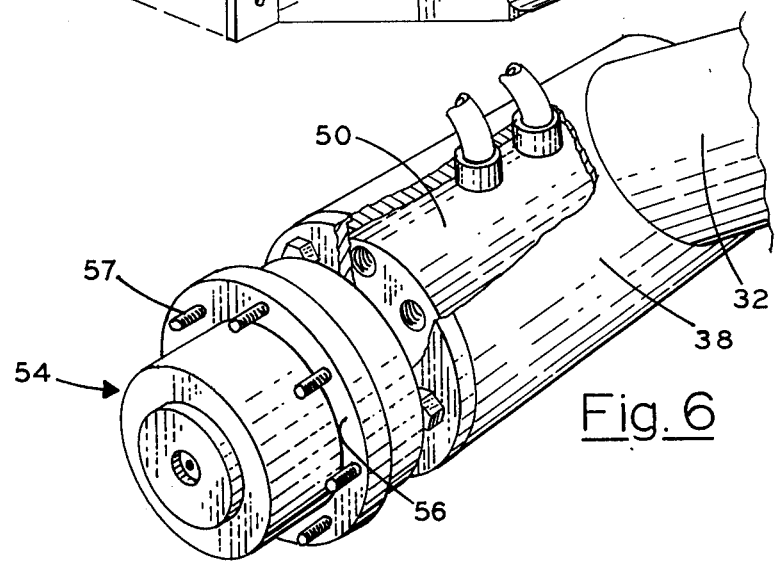
FIG. 6 is a fragmented view, on somewhat of an enlarged scale, of a hydraulic motor and gear reduction unit provided for driving the wheel, the wheel having been deleted for the sake of clarity.

The inclined segment 32 is projected upwardly from a cylindrical motor mount 38, FIG. 6, and is rigidly connected at its upper end with the segment 34, which, in turn, is connected to the crown segment 36. It is to be understood that the dimensions of the segments 32, 34, and 36 are such as to position the wheel 30 beneath the frame member 18. Additionally, it is to be understood that the frame member 18 and the wheel frame 26 are formed of a material having a suitable strength-to-weight ratio, and that the operator's platform 19 is rigidly affixed to the frame member so that a fixed relationship therebetween is at all times maintained.

Figure 4:
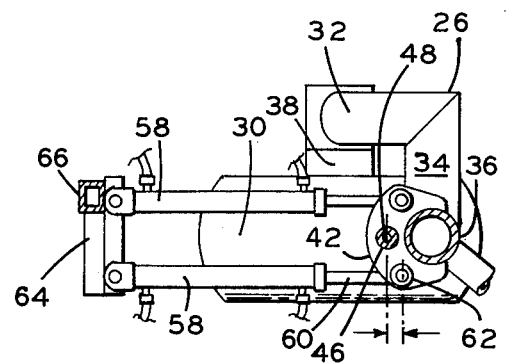
FIG. 4 is a partially sectioned view taken generally along line 4—4 of FIG. 3.

The wheel frame 26 is connected with the frame member 20 through a pivotal coupling 40, whereby pivotal oscillation of the wheel frame 26 is afforded for accommodating steerage. The coupling 40 includes a pair of vertically spaced rearwardly extended plates 42 and 44, welded or otherwise rigidly affixed to the crown segment 36 of the wheel frame 26. Each of the plates 42 and 44 includes a vertically oriented journal bearing 46, only one of which is shown in FIG. 4. The journal bearing 46 for each of the plates 42 and 44 serves to receive a vertically oriented journal pin 48 rigidly affixed to and projected from the frame member 18. Thus, the crown segment 36 is supported for angular displacement in horizontal directions about a pivotal axis extended vertically through the pivotal coupling 40 in a leading relationship with the axis for the wheel 30, as indicated in FIG. 3.

As best illustrated in FIG. 6, the motor mount 38 serves to receive in a concentric relationship hydraulic motor 50 which includes a housing, not designated, also of a cylindrical configuration. The motor 50 is of a suitable design and capacity dictated by power requirements for the draft attachment. In practice, the motor 50 is rigidly supported by the motor mount 38 with a rotary output shaft, not shown, being projected axially from the motor mount 38.

The rotary output shaft for the hydraulic motor 50, in turn, is connected with a gear reduction unit 54 circumscribed by a wheel mounting ring 56 upon which the wheel 30 is mounted employing an array of studs 57 projected from the mounting ring 56. The wheel mounting ring 56 is coaxially aligned with the motor 50 and is driven in rotation by the gear train, not shown, of the gear reduction unit. Thus the mounting ring 56 functions as an output for the gear reduction unit 54. The gear reduction unit 54 also is affixed to and supported by the motor mount 38. Thus a gear reduction unit serves to impart rotation to the wheel 30 connected therewith through the wheel mounting ring 56.

It is important to appreciate that the gear reduction unit 54 is commercially available. While the gear reduction unit 54 is of any suitable design, one such gear reduction unit is referred to as a "Power Wheel" and is available from Warner Gear, a Division of Borg-Warner Corporation, Muncie, Indiana 47302. Since the gear reduction unit is varied as desired, and is commercially available, a detailed description of the gear reduction unit 54 is omitted in the interest of brevity. However, it is to be understood that the gear reduction unit 54 serves to gear-down the output obtained from the rotary output shaft 52 of the hydraulic motor 50 and to transmit torque to the wheel mounting ring 56. The torque is thus transferred from the motor 50 to the ground wheel 30, whereby traction is imparted to the draft attachment 10.

It should be apparent that since the motor 50 is in juxtaposition with the wheel 30, and power is transmitted through a single gear reduction unit, the length and complexity of the power train employed in transmitting power from the motor to the wheel is substantially reduced. The thus shortened and simplified power train coupled with the constant power output, which characterizes hydraulic motors, tends to reduce and in most instances eliminate oscillating shock effects resulting from oscillatory forces acting on the implement 12.

Steerage for the draft attachment 10 is achieved through a selective operation of a pair of double acting slave cylinders 58 arranged in parallelism and interconnected between the wheel frame 26 and the frame member 18. Each of the slave cylinders 58 includes a linear output shaft 60 connected at its distal end, through a suitable clevis 62, to the plate 42. The output shafts 60 are connected to the plate 42 in mutually spaced relation, forwardly of the axis for the pivotal coupling 40, as indicated in FIG. 3. The pair of slave cylinders 58 are disposed in coplanar relationship beneath the horizontal segment 20 of the frame member 18, at opposite sides of a vertical plane. As a practical matter, the slave cylinders 58 are pivotally supported as the base ends thereof by a horizontally extended base member 64. The base member is supported, in turn, by a bracket 66 suspended from the horizontal segment 20 of the frame member 18.

It should be apparent that by selectively extending and retracting the output shafts 60 of the slave cylinders 58, it is possible to force the crown segment 36 of the wheel frame 26 to advance along an arcuate path for selectively redirecting the wheel 30.

It is important to note that in order to alter the direction of travel of the frame 26, the shaft 60 of one slave cylinder is extended while the shaft 60 of the other slave cylinder of the pair of slave cylinders 58 is retracted. Due to the inherent design of double-acting slave cylinders, the combined effective surface area of the piston heads of the pair of slave cylinders is equalized. Thus the crown segment is caused to undergo displacement at a constant rate as it is displaced in opposite directions along its arcuate path.

Moreover, due to the fact that the extended or distal ends of the output shafts 60 are connected to the plate 42 forwardly of a transverse vertical plane passing through the pivotal coupling 40, the throw of the shafts, particularly in retracting directions, is increased. Thus the total angle through which the plate 42 is displaced about the turning axis is increased. The increased throw of the shafts, of course, serves to increase the length of the throw of the crown segment 36. Such an increase in the length of the throw of the segment 36 results in an attendant increase in the angular displacement of the wheel 30 about an axis passing vertically through the axis of rotation thereof.

The coupling 22 is connected with the lowermost end of the inclined segment 21 and is configured to function as a quick disconnect unit through which coupling of the draft attachment 10 with a selected implement is facilitated. As shown, the coupling 22 includes a rearwardly opening female socket 68. The internal surface of the socket is of a truncated, pyramidal configuration having four converging internal surfaces. Externally, a pair of vertically oriented laterally extended ears 69 are provided for reasons which will become apparent.

Figure 5:
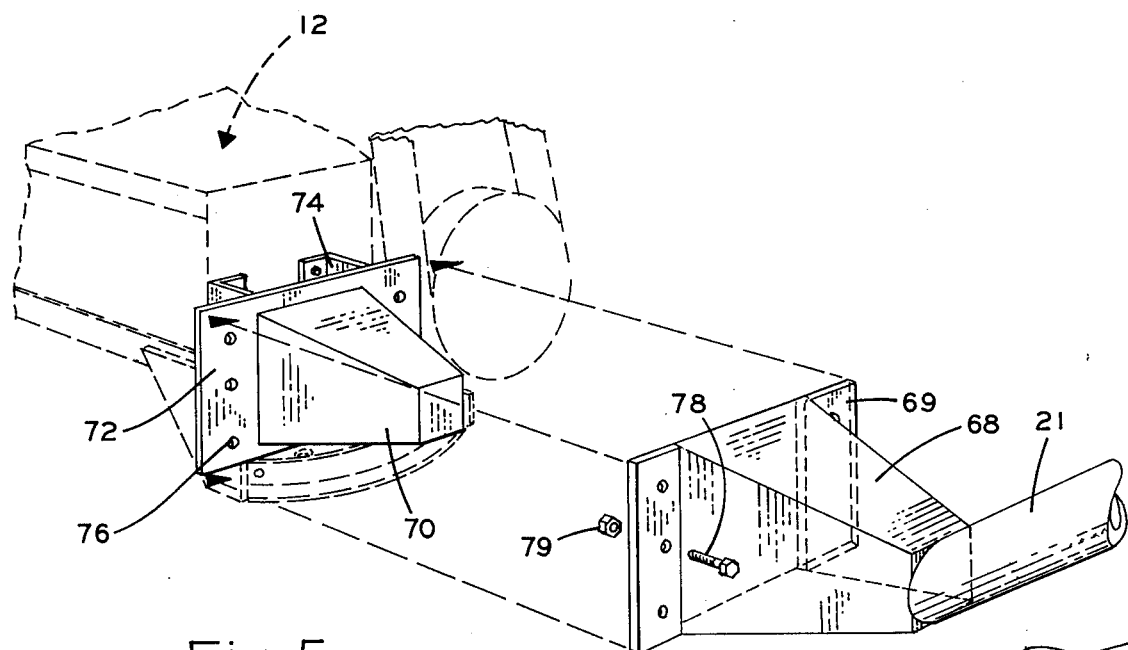
FIG. 5 is an exploded view illustrating the improved coupling shown in FIG. 1.

The coupling 22 also includes a male protuberance 70 the external surface of which is of a configuration and dimension similar to that of the internal surfaces of the female socket 68. The male protuberance includes a pair of laterally extended ears 72 which mate with the ears 69 in a face-to-face relationship as the male protuberance is received within the female socket 68. The male protuberance 70, as a practical matter, is mounted on the implement 12 utilizing any suitable structure such as through a use of a bracket, designated 74. The ears 69 and 72 include coaxially aligned apertures 76 which serve to receive a plurality of bolts 78, each of which receives a nut 79, only one of which is shown in FIG. 5, for purposes of securing the coupling in a mated configuration.

It is to be understood that the female socket 68 serves as a receptacle for the male protuberance 70 and that the protuberance is received with the external surface thereof being seated in engagement with the internal surface of the female socket. The ears 69 and 72 are brought into face-to-face engagement as the male protuberance 70 bottoms-out within the female socket 68 with the apertures 76 aligned for receiving bolts 78. Of course, the planar configuration of the mated surfaces of the female socket and male protuberance and the bolts 78 employed for securing the coupling 22 in a mated configuration serve to couple the draft attachment 10 in a rigidly fixed relationship with the implement 12. Thus the implement 12 is caused to lend vertical and lateral stability to the draft attachment 10, as it acts through the coupling 22.

Figure 7:
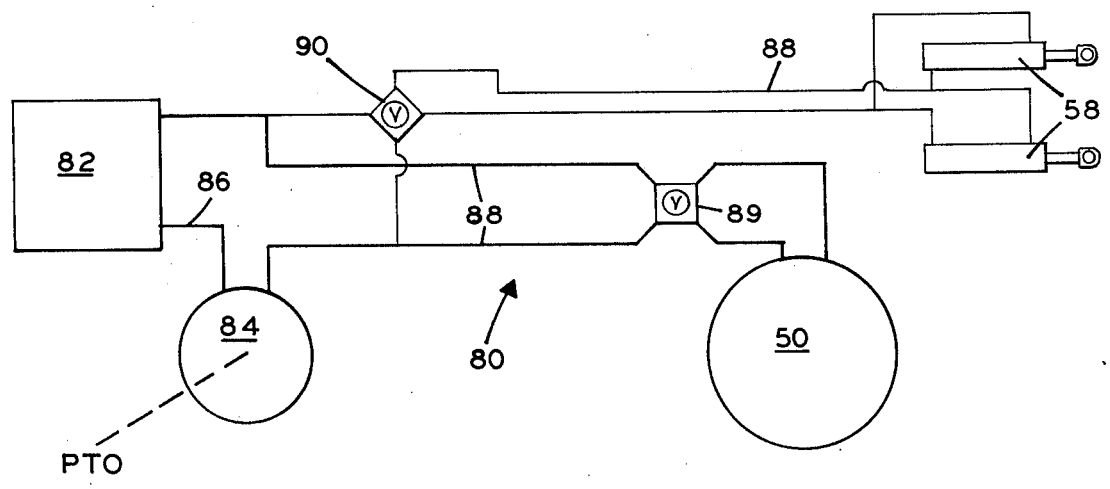
FIG. 7 is a diagrammatic view illustrating a hydraulic circuit for the draft attachment.

A hydraulic circuit 80, as diagrammatically illustrated in FIG. 7, is povided or energizing the hydraulic motor 50 and the slave cylinders 58. The circuit 80 includes a reservoir 82 and a pump 84 connected therewith through a suitable supply line 86. The pump 84, in turn, is connected with the slave cylinders 58 and the motor 50 through suitable tubing 88 in a manner well understood by those familiar with hydraulic systems. A selector valve 90 is interposed between the pump 84 and the slave cylinders for controlling the modes of operation therefor.

As a practical matter, the selector valve 90 is connected with the slave cylinders 58 in a manner such that the slave cylinders 58 are simultaneously and reversely pressurized, whereby reversed directions of motion are imparted to the output shafts 60. Additionally, it is important to note that the selector valve 90 is connected through a suitable linkage, not shown, with a steering wheel 92 provided at the operator platform 19. Of course, where so desired, the steering wheel can be replaced by a simple lever arm connected with the selector valve 90.

As a practical matter, the pump 84 is connected with the PTO 16 through a suitable drive train, not shown, such as by an input shaft coupled directly to the drive shaft of the flywheel for the PTO 16. Therefore, it will be appreciated that the pump 84 is driven by the PTO 16 for purposes of energizing the hydraulic circuit 80 and through such energization of the hydraulic circuit 80 driven rotation for the ground wheel 30 and steerage through the wheel frame 26 are achieved.

While the specific drive train employed in connecting the pump 84 with the motor 16 forms no specific part of the instant invention, it is to be understood that the pump is connected in any suitable fashion.

Additionally, the reservoir 82 is positioned at a suitable location aboard the draft attachment 10. If so desired, the inclined segment 21 of the frame member 18 can be employed as a container for confining hydraulic fluid for the hydraulic circuit 80.

Finally, in certain instances it is desirable to tow the draft attachment 10 utilizing an auxiliary tractor or the like. Therefore, an articulated linkage 94 is pivotally mounted on the steering assembly 24. This linkage includes a trailer hitch 96 at its distal end, whereby the draft attachment 10 and implement 12 can be towed simply by connecting the trailer hitch 96 with a suitable tow bar. The steering assembly 24, of course, causes the draft attachment 10 to track the towing vehicle with minimal difficulty.

OPERATION

It is believed that in view of the foregoing description, the operation of the device will readily be understood and it will be briefly reviewed at this point.

With the draft attachment 10 assembled in the manner hereinbefore described, it is connected in a mounted relationship with the implement 12 simply by mating the male protuberance with the female socket of the coupling 22 and thereafter securing the protuberance within the socket utilizing the bolts 78 and nuts 79. As a matter of interest, a forklift serves quite satisfactorily in handling the draft attachment 10 during mounting operations.

Once the coupling 22 has been secured in a mated configuration, the pump 84 is connected with the PTO 16. Thus the draft attachment 10 is prepared for operation.

The implement 12, acting through the coupling 22, lends both vertical and lateral stability to the draft attachment, due to the fact that the trailing end of the frame member 18 is supported above the ground and rotary motion at the coupling 22 is precluded by the configuration of the male and female components of the coupling 22, as well as by the bolts 78.

The draft assembly 10 and implement 12 can be towed to a field utilizing the trailer hitch 96. The steering assembly 24 accommodates tracking during towing.

Where the implement 12 is a baler, the draft attachment 10 and implement 12 are suitable positioned to begin a baling operation. The PTO 16 is then activated whereupon the pump 84 is driven in response to an activation of the PTO 16 for thus pressurizing the hydraulic circuit 80. The selector valve 89 is next repositioned in a predetermined direction, by an operator seated on the operator platform 19, for energizing the motor 50 whereupon torque is transmitted to the gear reduction unit 54. In response to the torque transmitted to the gear reduction unit 54, the wheel amount 56 is driven in rotation for angularly displacing the ground wheel 30. Thus the draft attachment 10 is propelled for drawing the implement 12 attached thereto. Of course, in order to stop the vehicle or reverse its direction of travel, the selector valve 89 is repositioned by the operator in a suitable manner.

As the draft attachment 10 is propelled steerage is imposed thereon through a manipulation of the selector valve 90 as the operator selects a course and rotates the steering wheel 92 for selectively pressurizing the slave cylinders. As the slave cylinders 58 are energized, the output shafts 60 cause the steering assembly 24 to rotate about the vertical axis extended through the pivotal coupling 40, for thus changing the direction of travel for the draft instrument.

In view of the foregoing, it should readily be apparent that the draft attachment 10 provides a practical solution to the problem of providing an economic, practical and simple draft attachment characterized by a high degree of maneuverability, without sacrificing desirable characteristics for draft attachment heretofore recognized.

Although the invention has been therein shown and described in what is conceived to be the most practical and preferred embodiment, it is recognized that departures may be made therefrom within the scope of the invention, which is not to be limited to the illustrative details disclosed.

Having described our invention, what we claim as new and desire to secure by Letters Patent is:

1. An improved draft attachment for a wheeled implement comprising:
    A. an elongated vehicle frame of a rigid, segmented configuration characteried by a forwardly extended, horizontally oriented leading segment and a rearwardly extended, downwardly inclined trailing segment;
    B. means for imparting vertical and lateral stability to the vehicle frame including an implement coupling mounted on the trailing segment adapted to rigidly connect the vehicle frame to a wheel-stabilized implement;
    C. an operator's platform mounted above the longitudinal axis of the leading segment of the vehicle frame in fixed relation therewith; and
    D. hydraulic drive means for propelling said attachment including an angularly displaceable, hydraulically driven steering assembly coupled to the leading segment of the vehicle frame in a supporting relationship therewith and adapted to oscillate about a turning axis disposed in a vertically oriented plane transversely related to the longitudinal axis of the vehicle frame, including a wheel frame pivotally connected to the leading segment of the vehicle frame, a ground wheel having an axis of rotation disposed in trailing relation with said turning axis, a gear reduction unit mounted on the wheel frame having a rotary output coupling including a wheel mounting ring concentrically related to the ground wheel and connected thereto in a driving relationship therewith, and a hydraulic motor mounted on the wheel frame having a rotary output shaft disposed in juxtaposition with the ground wheel and connected to said gear reduction unit.

2. The attachment of claim 1 wherein the wheel frame is of a segmented, caster-like configuration and includes a motor mount for supporting said hydraulic motor in coaxial alignment with the ground wheel, an inclined segment having one end affixed to said motor mount and extended through said vertically oriented plane, a vertically oriented crown segment rigidly connected to said inclined segment at the uppermost end thereof, and coupling means for pivotally connecting the crown segment of said wheel frame to the vehicle frame including at least one horizontally oriented plate rigidly affixed to said crown segment and at least one journal pin affixed to the leading segment of the vehicle frame and extended vertically through the plate.

3. The attachment of claim 2 further comprising steering means for imparting angular displacement to the wheel frame including a pair of double-acting slave cylinders having output shafts arranged in substantial parallelism at opposite sides of the longitudinal axis of said vehicle frame and extended through said vertical plane, means for coupling the base ends of the slave cylinders to the vehicle frame, means for pivotally connecting the extended ends of the output shafts with said plate, and means for simultaneously imparting linear motion in opposite directions to said shafts, whereby the wheel frame is caused to advance about said turning axis.

4. The attachment of claim 1 wherein said implement coupling includes a female socket having at least one internal face of a planar configuration and a male protuberance configured to be received in an interlocking mated relationship within said female socket and adapted to be rigidly affixed to the wheel-stabilized implement.

5. The attachment of claim 1 further comprising an hydraulic circuit connected with said hydraulic motor including a pump adapted to be connected in a driven relationship with a power plant mounted on said implement.

* * * * *

UNITED STATES PATENT AND TRADEMARK OFFICE
CERTIFICATE OF CORRECTION

PATENT NO. : 4,018,294
DATED : April 19, 1977
INVENTOR(S) : Everett V. Rankins

It is certified that error appears in the above-identified patent and that said Letters Patent are hereby corrected as shown below:

Column 2, Line 29, delete "and" and insert --- are ---.

Column 3, Line 29, delete "an" and insert --- and ---.

Column 4, Line 34, between "relationship" and "hydraulic" insert --- a ---.

Column 7, Line 44, delete "suitable" and insert --- suitably ---.

Column 7, Line 53, delete "amount" and insert --- mount ---.

Column 8, Line 19, delete "characteried" and insert --- characterized ---.

Signed and Sealed this fifth Day of July 1977

[SEAL]

Attest:

RUTH C. MASON
*Attesting Officer*

C. MARSHALL DANN
*Commissioner of Patents and Trademarks*